(12) United States Patent
Hälleberg

(10) Patent No.: US 7,437,234 B2
(45) Date of Patent: Oct. 14, 2008

(54) METHOD FOR ADJUSTING AN ON-TIME CALCULATION MODEL OR LOOKUP TABLE AND A SYSTEM FOR CONTROLLING AN INJECTOR OF A CYLINDER IN A COMBUSTION ENGINE

(75) Inventor: Roger Hälleberg, Nacka (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 11/747,621

(22) Filed: May 11, 2007

(65) Prior Publication Data

US 2007/0261483 A1    Nov. 15, 2007

(30) Foreign Application Priority Data

May 11, 2006  (SE) .................................... 0601055

(51) Int. Cl.
  *G06F 17/40*  (2006.01)
  *G01L 3/26*   (2006.01)

(52) U.S. Cl. ..................... 701/104; 123/447

(58) Field of Classification Search ......... 701/103–105, 701/102, 115; 123/446–447, 480, 497; 73/117.3
  See application file for complete search history.

(56) References Cited

U.S. PATENT DOCUMENTS

| | | | |
|---|---|---|---|
| 4,421,088 A | 12/1983 | Seilly | 123/447 |
| 5,176,122 A | 1/1993 | Ito | 123/447 |
| 5,313,924 A * | 5/1994 | Regueiro | 123/446 |
| 5,819,709 A * | 10/1998 | Holmes et al. | 123/497 |
| 5,927,253 A * | 7/1999 | Oyafuso et al. | 123/497 |
| 7,210,459 B2 * | 5/2007 | Shibata | 123/480 |
| 2007/0124183 A1* | 5/2007 | Williams et al. | 705/7 |

* cited by examiner

*Primary Examiner*—Hieu T Vo
(74) *Attorney, Agent, or Firm*—Ostrolenk, Faber, Gerb & Soffen, LLP

(57) ABSTRACT

A method for adjusting an on-time calculation model or a lookup table used for determining on-time values for an injector of a cylinder in a combustion engine useful in a motor vehicle, where the injector is connected to a fuel accumulator. The method comprises the steps of injecting a test fuel quantity exceeding the maximum allowed fuel injection quantity under such conditions that no ignition of the injected fuel takes place; measuring the pressure drop in the fuel accumulator during the test injection; establishing the actual fuel quantity injected during the test injection based on the pressure drop; performing a comparison based on the actual fuel quantity or the corresponding on-time value established with the aid of the on-time calculation model or the lookup table; and adjusting the on-time calculation model or lookup table in dependence on the result of the comparison. An apparatus which performs the method. A computer program to perform the method.

10 Claims, 2 Drawing Sheets

METHOD FOR ADJUSTING AN ON-TIME CALCULATION MODEL OR LOOKUP TABLE AND A SYSTEM FOR CONTROLLING AN INJECTOR OF A CYLINDER IN A COMBUSTION ENGINE

TECHNICAL FIELD

The present invention relates to a method for adjusting an on-time calculation model or lookup table used for determining on-time values for an injector of a cylinder in a combustion engine of a motor vehicle where said injector is connected to a fuel accumulator of a common-rail fuel injection system. The invention also relates to a system for controlling an injector of a cylinder in a combustion engine of a motor vehicle where said injector is connected to a fuel accumulator of a common-rail fuel injection system. Furthermore, the invention relates to a computer program comprising computer program code for implementing the method, a computer program product comprising a data storage medium readable by an engine electronic control unit and having said computer program stored thereon, and an engine electronic control unit.

In this description and the subsequent claims, the term "on-time" refers to the opening time of an injector, i.e. the duration of the time period during which the injector is kept open in order to inject fuel into the associated cylinder in connection with a single cylinder stroke cycle. The quantity of fuel injected into a cylinder in connection with a cylinder stroke cycle depends on the length of this on-time and the pressure of the fuel in the fuel accumulator of the common rail fuel injection system.

BACKGROUND ART

A conventional combustion engine for a motor vehicle, such as for instance a car, lorry, towing vehicle or bus, is provided with injectors for injecting desired quantities of fuel at desired moments into the cylinders of the engine. The injectors are controlled by means of an engine control unit, which controls the on-times for each individual injector so as to thereby control the quantity of fuel to be injected into the cylinder associated with the injector. It is a common practice to establish suitable on-times for the injectors with the aid of an on-time lookup table comprising preset on-time values for the injectors linked to fuel injection quantity values, where the fuel injection quantity values represent different desired quantities of fuel to be injected into a cylinder of the engine and the on-time values represent the associated on-times for an injector. For a common rail fuel injection system, the on-times of such a lookup table are linked both to such fuel injection quantity values and to fuel pressure values representing different fuel pressures in the fuel accumulator of the common rail fuel injection system. Alternatively, the on-times for the injectors may be established with the aid of an on-time calculation model based on such fuel injection quantity values and fuel pressure values. The engine control unit determines the present fuel injection quantity value, i.e. the desired quantity of fuel to be injected by an injector at the present cylinder stroke cycle, with the aid of a regulator in dependence on the present operating conditions of the vehicle. Based on the present fuel injection quantity value and the present fuel pressure value, the engine control unit will establish a present on-time for an injector with the aid of said on-time calculation model or lookup table. This on-time is expected to result in the injection of the desired fuel quantity, i.e. a fuel quantity corresponding to said present fuel injection quantity value. However, in course of time, the characteristics of an injector may change in such a manner that the on-time values established with the aid of the on-time calculation model or lookup table will not give the expected fuel injection quantities. Such deviations between expected and actual fuel injection quantities are undesired for several reasons.

It is known, e.g. from U.S. Pat. No. 4,421,088, that the quantity of fuel injected into a cylinder by an injector connected to a fuel accumulator of a common rail fuel injection system is related to the pressure drop of the fuel in the fuel accumulator during the injection. U.S. Pat. No. 5,176,122 discloses a manner of establishing the quantity of fuel injected into a cylinder by an injector connected to a fuel accumulator of a common rail fuel injection system based on a measurement of the pressure drop of the fuel in the fuel accumulator during the injection. According to U.S. Pat. No. 5,176,122, the thus established fuel injection quantity is used for correcting the quantity of fuel to be injected by the injector.

However, there are fluctuations in the pressure of the fuel in the fuel accumulator of a common rail fuel injection system. The amplitudes of these fluctuations are rather large in relation to the normal magnitude of the pressure drop of the fuel in the fuel accumulator during a fuel injection, which may result in an inaccurate value of the fuel injection quantity established in the above-indicated manner based on a measurement of the pressure drop of the fuel in the fuel accumulator during a fuel injection.

SUMMARY OF THE INVENTION

An object of the present invention is to propose a solution to the above-indicated problem so as to thereby make possible an improved accuracy in the control of the quantity of fuel injected by an injector connected to a fuel accumulator of a common rail fuel injection system.

This object is achieved by means of a method and a system having the features defined herein.

The inventive solution involves the execution of the following steps

A) interrupting the supply of fuel to the fuel accumulator;

B) executing a test injection of fuel into a cylinder with an injector by making engine control means apply an on-time value for the injector corresponding, in accordance with an on-time calculation model or lookup table used by the engine control means, to a fuel injection quantity $\delta_{test}$, here denominated test fuel quantity, exceeding the maximum allowed fuel injection quantity of the cylinder, while maintaining the supply of fuel to the fuel accumulator interrupted, this test injection being executed under such conditions that no ignition of the injected fuel takes place in the cylinder;

C) determining or receiving a pressure drop value $\Delta P$ representing the pressure drop of the fuel in the fuel accumulator during the test injection and a fuel pressure value $P_{test}$ representing the fuel pressure in the fuel accumulator at the start of said pressure drop;

D) establishing the actual fuel quantity $\delta_{actual}$ injected into the cylinder during said test injection with the aid of a fuel quantity calculation model or lookup table based on said pressure drop value $\Delta P$ and said fuel pressure value $P_{test}$;

E) comparing said actual fuel quantity $\delta_{actual}$ with said test fuel quantity $\delta_{test}$, or comparing an on-time value $t_a$ established with the aid of said on-time calculation model or lookup table based on said actual fuel quantity $\delta_{actual}$ and said fuel pressure value $P_{test}$ with the on-time value $t_{test}$ applied for the test injection; and F) adjusting said on-time calculation model or lookup table in dependence on the result of said comparison.

In this description and the subsequent claims, the "maximum allowed fuel injection quantity of a cylinder" refers to the maximum fuel quantity that is allowed to be injected into and ignited in the cylinder. This maximum allowed fuel injection quantity is established by the engine manufacturer based on the dimensioning and the strength of the engine components.

According to the invention, a test fuel quantity exceeding the maximum allowed fuel injection quantity of the cylinder is injected during the test injection. The maximum allowed fuel injection quantity of the cylinder can be exceeded owing to the fact that the test injection is executed under such conditions that no ignition of the injected fuel takes place in the cylinder. Thus, the large quantity of fuel injected during the test injection is discharged from the cylinder without having been ignited and will therefore not cause any damages to the engine.

The inventive solution is based on the realization that an increased fuel injection quantity and thereby an increased pressure drop during an injection will decrease the ratio between the amplitudes of the fluctuations in the pressure of the fuel in the fuel accumulator and the value of the pressure drop since the amplitudes of said fluctuations will remain at the normal level when the fuel injection quantity is increased to a magnitude above the normal level, and on the realization that the result of tests performed with fuel injection quantities exceeding the normally applied fuel injection quantities can be used for adjusting on-time values related to fuel injection quantities of high but normal and allowed magnitudes owing to the essentially linear relation between the on-time values and the fuel injection quantities for fuel injection quantities exceeding a certain level. Said decreased ratio between the amplitudes of the fluctuations in the pressure of the fuel in the fuel accumulator and the value of the pressure drop during the test injection as compared to a normal injection implies that the fluctuations will have a reduced impact on the value of the actual fuel quantity injected into the cylinder that is established based on the measured value of said pressure drop.

With the inventive solution, the adjustment of said on-time calculation model or lookup table may be accomplished by modifications in the software already provided in a modern vehicle, without requiring any installation of new sensors or hardware in the vehicle. Thus, the inventive solution may be implemented at rather low costs. With the inventive solution, the on-time calculation model or lookup table may be adjusted so as to offer improved accuracy in the control of the quantity of fuel injected by the injectors of a vehicle engine, which for instance will make it possible to achieve a more smooth running of the engine and a better accuracy of the vehicle's driving computer with respect to the registration of consumed fuel quantity.

According to an embodiment of the invention, several adjustment cycles, each of which comprising said steps A-F, are performed with mutually different fuel pressure values $P_{test}$ at the start of the test injections and/or with mutually different test fuel quantities $\delta_{test}$. Hereby, the accuracy in the adjustment of the on-time calculation model or lookup table may be improved.

Further advantageous features of the inventive method and the inventive system will appear from the dependent claims and the following description.

The invention also relates to a computer program, a computer program product having the features and an engine electronic control unit having the features defined herein.

BRIEF DESCRIPTION OF THE DRAWINGS

The invention will in the following be more closely described by means of embodiment examples, with reference to the appended drawings, where.

PREFERRED EMBODIMENTS OF THE INVENTION

Figure 1:
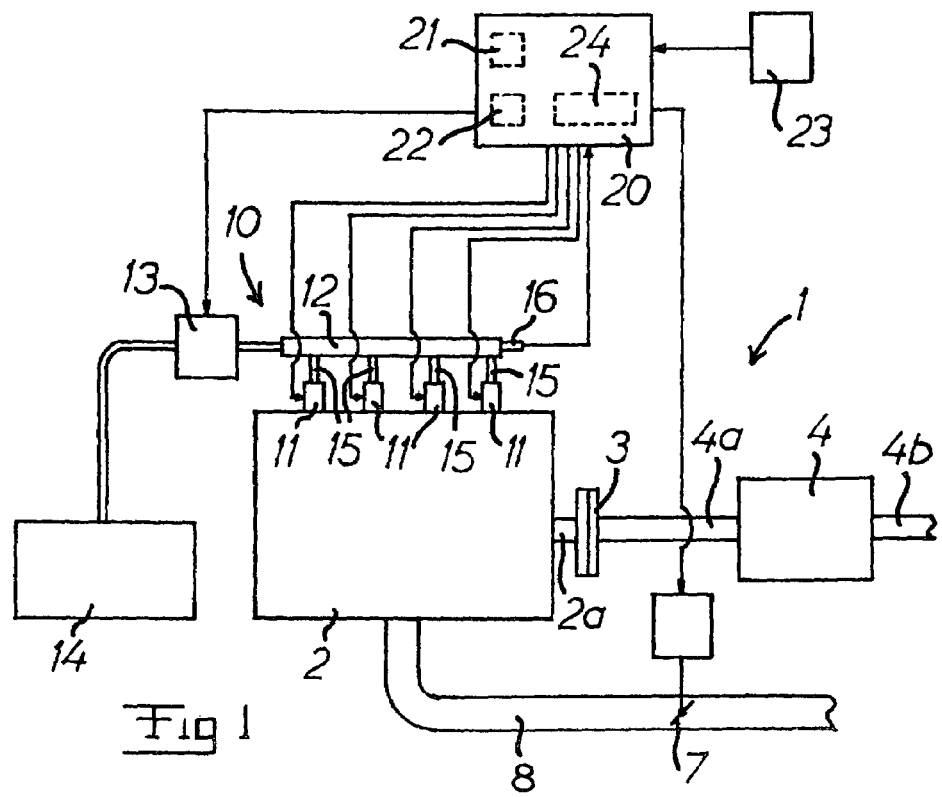
FIG. 1 is a schematic diagram of a combustion engine with a common rail fuel injection system.

A part of a drive line 1 of a motor vehicle is schematically illustrated in FIG. 1. The drive line 1 comprises a vehicle engine 2 in the form of a conventional combustion engine, such as a diesel engine, which is connected to driving wheels (not shown) of the vehicle via a clutch 3 and a gearbox 4. The output shaft 2a of the engine 2 is connected to the input shaft 4a of the gearbox via said clutch 3, which is arranged to transfer the torque exerted by the engine to the input shaft 4a of the gearbox. The output shaft 4b of the gearbox is connected to said driving wheels.

The engine 2 comprises a plurality of cylinders. Although FIG. 1 schematically illustrates a four-cylinder engine as an example, the engine 2 may comprise any suitable number of cylinders. Fuel is supplied to the cylinders by means of a common rail fuel injection system 10. This fuel injection system 10 comprises a number of electrically controlled injectors 11. Each cylinder of the engine 2 is associated with its own injector 11. The injectors 11 are connected to a fuel accumulator 12 in the form of a co-called common rail, which constitutes an accumulator for accumulating high-pressure fuel to be supplied to the injectors. The fuel accumulator 12 is supplied with high-pressure fuel by a pump 13, which receives fuel from the fuel tank 14 of the vehicle. The injectors 11 are connected to the fuel accumulator 12 via fuel pipes 15 branching from the fuel accumulator so as to inject high-pressure fuel accumulated in the fuel accumulator 12 into the respective cylinders.

Figure 2:
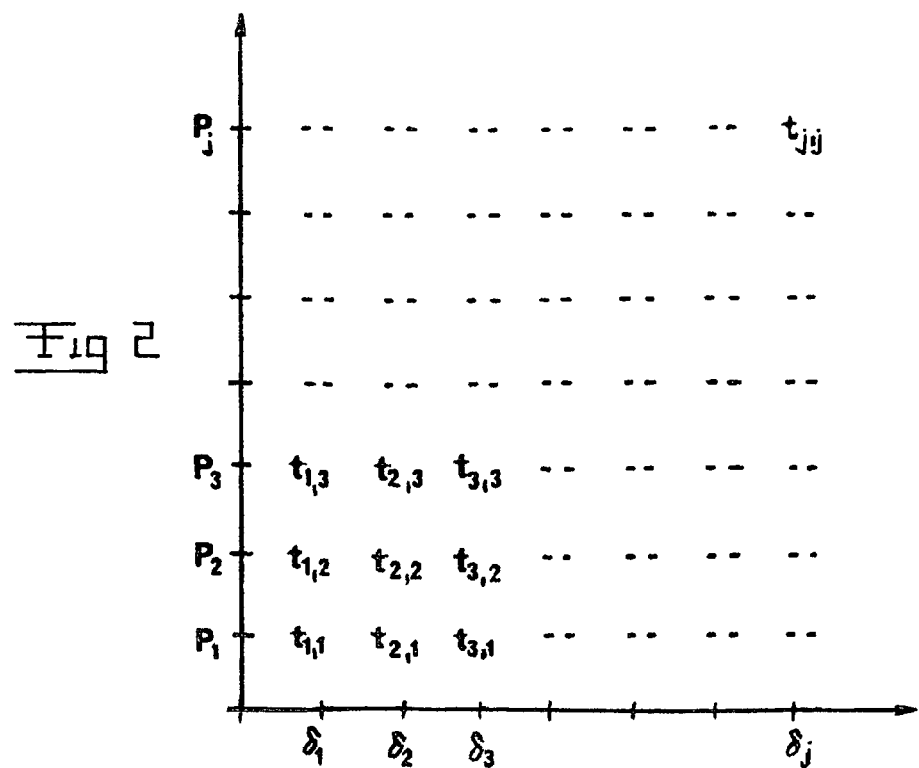
FIG. 2 is a schematic visualization of an on-time lookup table.

The invention is applicable to vehicles having a common rail fuel injection system where the on-times for the injectors 11 are controlled by engine control means 20, e.g. in the form of an electronic control unit, with the aid of an on-time calculation model or lookup table based on a fuel pressure value P and a fuel injection quantity value $\delta$, where said fuel pressure value P represents the fuel pressure in the fuel accumulator 12 and said fuel injection quantity value $\delta$ represents a desired quantity of fuel to be injected into a cylinder of the engine 2. The fuel pressure value P and the fuel injection quantity value $\delta$ are input parameters of said on-time calculation model or lookup table and the output is an on-time value t representing the associated on-time for an injector 11, i.e. the on-time estimated to result in the injection of the desired quantity of fuel at the present fuel pressure in the fuel accumulator 12. Such an on-time calculation model or lookup table may be stored on a data storage medium 21 in the engine control means 20. An on-time lookup table of this type comprises preset on-time values t for an injector linked to fuel injection quantity values $\delta$ and fuel pressure values P and is visualized in FIG. 2. In the illustrated example, each on-time value t in the lookup table is linked to a fuel injection quantity value δ and a fuel pressure value P. For a specific combination of fuel injection quantity value $\delta_i$ and fuel pressure value $P_j$, the lookup table will give an on-time $t_{i,j}$ for the injector 11, which on-time $t_{i,j}$ is expected to result in the injection into the associated cylinder of a fuel quantity corresponding to the specified fuel injection quantity value $\delta_i$ in question at a fuel pressure in the fuel accumulator corresponding to the specified fuel pressure value $P_j$. Such an on-time lookup table or a corresponding calculation model is established by the vehicle manufacturer in a manner known to persons skilled in the art. For fuel injection quantity values δ exceeding a certain level, normally a level corresponding to a fuel injection quantity in the order of about 120-140 mg, there is an essentially linear relation between the fuel injection quantity values δ and the associated on-time values t for a given fuel pressure value P.

The present fuel injection quantity value δ, i.e. the desired quantity of fuel to be injected into a cylinder at the present moment, may during normal engine operation be determined in a conventional manner by the engine control means 20 with the aid of a regulator 22 in dependence on the present operating conditions of the vehicle. Said regulator 22 is for instance a conventional PID-regulator or any other suitable type of regulator implemented in the form of software or hardware or a combination of software and hardware. The engine control means 20 is connected to different types of sensors, commonly indicated by the block 23 in FIG. 1, which provide the engine control means 20 with information as to different operating parameters of the vehicle that influence the magnitude of the fuel injection quantity value δ. The engine control means 20 is also connected to a pressure sensor 16, which provides the engine control means 20 with information as to the fuel pressure, i.e. the pressure of the fuel in the fuel accumulator 12. Based on the present fuel injection quantity value δ established with the aid of the regulator 22, or established in any other suitable manner, and the present fuel pressure value P, the engine control means 20 will establish a present on-time value t for an injector 11 with the aid of the above-indicated on-time calculation model or lookup table.

The desired fuel pressure in the fuel accumulator 12 depends on the present operating conditions of the vehicle and is controlled by the engine control means 20 via the pump 13.

According to the invention, the engine control means 20 comprises processing means 24 adapted to execute the following steps:

A) interrupt the supply of fuel to the fuel accumulator 12;

B) execute a test injection of fuel into a cylinder with an injector 11 by applying an on-time value $t_{test}$ for the injector corresponding, in accordance with said on-time calculation model or lookup table, to a fuel injection quantity $\delta_{test}$, here denominated test fuel quantity, exceeding the maximum allowed fuel injection quantity of the cylinder, while maintaining the supply of fuel to the fuel accumulator 12 interrupted, this test injection being executed under such conditions that no ignition of the injected fuel takes place in the cylinder;

C) determine or receive a pressure drop value ΔP representing the pressure drop of the fuel in the fuel accumulator during the test injection and a fuel pressure value $P_{test}$ representing the fuel pressure in the fuel accumulator 12 at the start of said pressure drop;

D) establish the actual fuel quantity $\delta_{actual}$ injected into the cylinder during said test injection with the aid of a fuel quantity calculation model or lookup table based on said pressure drop value ΔP and said fuel pressure value $P_{test}$;

E) compare said actual fuel quantity $\delta_{actual}$ with said test fuel quantity $\delta_{test}$, or compare an on-time value $t_a$ established with the aid of said on-time calculation model or lookup table based on said actual fuel quantity $\delta_{actual}$ and said fuel pressure value $P_{test}$ with the on-time value $t_{test}$ applied for the test injection; and F) adjust said on-time calculation model or lookup table in dependence on the result of said comparison.

The supply of fuel to the fuel accumulator 12 is interrupted during said steps A-C by making the engine control means 20 control the pump 13 to stop supplying fuel to the fuel accumulator 12.

The test fuel quantity $\delta_{test}$ is injected into the cylinder during a cylinder stroke cycle between the moment when the cylinder pressure and thereby the cylinder temperature has dropped to such a level that no ignition of the fuel can take place in the cylinder and the moment when the gases are discharged from the cylinder. Hereby, the large quantity of fuel injected during the test injection will be prevented from being ignited in the cylinder and will be discharged from the cylinder before the next cylinder stroke cycle. The engine control means 20 is suitably made to apply, in said step B, an on-time value $t_{test}$ for the injector corresponding, in accordance with said on-time calculation model or lookup table, to a test fuel quantity $\delta_{test}$ exceeding the maximum allowed fuel injection quantity of the cylinder by a factor of at least 1.5 and preferably by a factor of 2-3. It is realized that the on-time calculation model or lookup table must be established so as to cover the on-time value $t_{test}$ and the test fuel quantity $\delta_{test}$ applied for the test injection.

The value ΔP of the fuel pressure drop in the fuel accumulator 12 during the test injection may be established based on measuring values from the above-indicated pressure sensor 16.

The quantity of fuel actually injected by the injector 11 during the test injection is established in the above-indicated step D with the aid of a fuel quantity calculation model or lookup table based on the value ΔP of the pressure drop in the fuel accumulator 12 during the test injection and the fuel pressure value $P_{test}$ at the start of said pressure drop. This establishment is based on the fact that there is a specific relation, for each type of engine and for a given fuel pressure in the fuel accumulator 12 of the common rail fuel injection system, between the quantity of fuel injected into a cylinder by an injector connected to the fuel accumulator and the pressure drop of the fuel in the fuel accumulator during the injection. The magnitude of the fuel quantity $\delta_{actual}$ injected into a cylinder during an injection as a function of the pressure drop ΔP in the fuel accumulator 12 during the injection and the fuel pressure in the accumulator at the start of the injection may be established for a vehicle engine by means of empirical tests and may be expressed in the form of a calculation model or lookup table, here denominated fuel quantity calculation model or lookup table. Such a fuel quantity calculation model or lookup table may be stored on a data storage medium 21 in the engine control means 20.

In the above-indicated step E, a fuel injection quantity value corresponding to the actual fuel quantity $\delta_{actual}$ established in step D may be used as an input value, together with the fuel pressure value $P_{test}$ for the test injection, in the on-time calculation model or lookup table in order to retrieve the on-time value $t_a$ of the on-time calculation model or lookup table corresponding to this actual fuel quantity. If the on-time calculation model or lookup table gives a correct on-time value $t_a$, this on-time value should be equal to or at least essentially equal to the on-time value $t_{test}$ applied by the engine control means 20 for the test injection. Thus, a comparison between said retrieved on-time value $t_a$ and said applied on-time value $t_{test}$ will give a measure of the correctness of the on-time calculation model or lookup table. Alternatively, a measure of the correctness of the on-time calculation model or lookup table may be obtained by comparing the established actual fuel quantity $\delta_{actual}$ with the expected test fuel quantity $\delta_{test}$. The relevant part of the on-time calculation model or lookup table, i.e. the above-indicated linear part, is then adjusted in dependence on the result of said comparison if the comparison indicates that such an adjustment is necessary.

The adjustment of the on-time calculation model or lookup table is with advantage based on the deviation calculated as a percentage between said actual fuel quantity $\delta_{actual}$ and said test fuel quantity $\delta_{test}$ or between the above-indicated on-time values $t_a$ and $t_{test}$.

Preferably, several test injections with the above-indicated evaluation thereof are performed with mutually different fuel pressure values $P_{test}$ at the start of the test injections and/or with mutually different test fuel quantities $\delta_{test}$.

Figure 4:
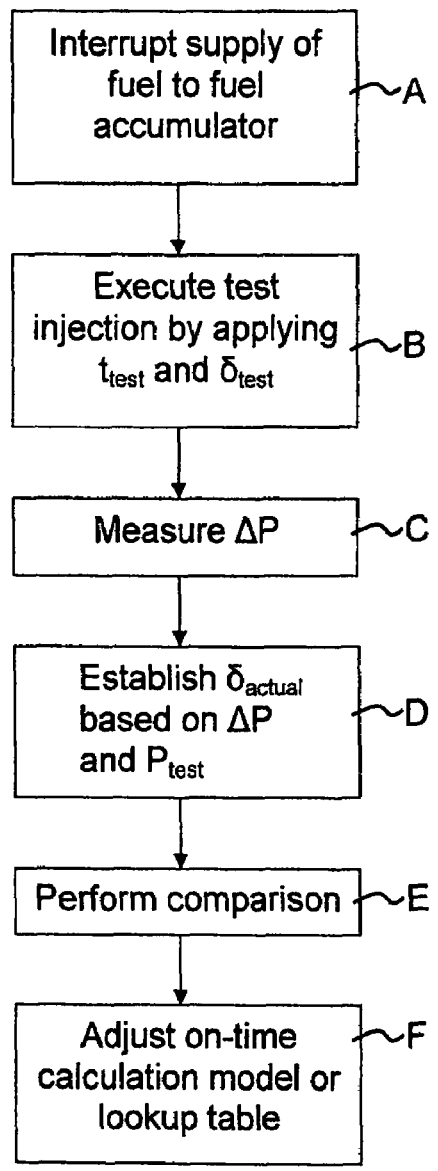
FIG. 4 is a flow diagram illustrating a method according to an embodiment of the invention.

A flow diagram illustrating a method according to an embodiment of the invention is shown in FIG. 4. In a first step A, the supply of fuel to the fuel accumulator 12 is interrupted. In a second step B, a test injection of fuel into the cylinder with the injector 11 is executed by making the engine control means 20 apply an on-time value $t_{test}$ for the injector corresponding, in accordance with said on-time calculation model or lookup table, to a test fuel quantity $\delta_{test}$ exceeding the maximum allowed fuel injection quantity of the cylinder, while maintaining the supply of fuel to the fuel accumulator 12 interrupted. This test injection is executed under such conditions that no ignition of the injected fuel takes place in the cylinder. In a third step C, the pressure drop $\Delta P$ of the fuel in the fuel accumulator 12 during the test injection is measured. In a fourth step D, the actual fuel quantity $\delta_{actual}$ injected into the cylinder during the test injection is established with the aid of a fuel quantity calculation model or lookup table based on the measured value $\Delta P$ of said pressure drop and the fuel pressure value $P_{test}$ at the start of said pressure drop. In a fifth step E, said actual fuel quantity $\delta_{actual}$ is compared with said test fuel quantity $\delta_{test}$, or an on-time value $t_a$ established with the aid of said on-time calculation model or lookup table based on said actual fuel quantity $\delta_{actual}$ and said fuel pressure value $P_{test}$ is compared with the on-time value $t_{test}$ applied for the test injection. Then, in a sixth step F, the on-time calculation model or lookup table is adjusted in dependence on the result of said comparison. These steps A-F may then be repeated for new fuel pressure values $P_{test}$ and/or new test fuel quantities $\delta_{test}$.

Computer program code for implementing a method according to the invention is suitably included in a computer program, which is loadable directly into the internal memory of engine control means 20, such as the internal memory of an engine electronic control unit, in a motor vehicle comprising a combustion engine 2 having an injector 11 of a cylinder connected to a fuel accumulator 12 of a common-rail fuel injection system, the on-times for the injector being controlled by the engine control means 20 with the aid of an on-time calculation model or lookup table based on a fuel pressure value P and a fuel injection quantity value $\delta$. Such a computer program is suitably provided via a computer program product comprising a data storage medium readable by an electronic control unit, which data storage medium has the computer program stored thereon. Said data storage medium is for instance an optical data storage medium in the form of a CD-ROM disc, a DVD disc etc, a magnetic data storage medium in the form of a hard disc, a diskette, a cassette tape etc, or a memory of the type ROM, PROM, EPROM or EEPROM or a Flash memory.

The computer program according to an embodiment of the invention comprises computer program code for causing said engine control means:

A) to interrupt the supply of fuel to the fuel accumulator;

B) to execute a test injection of fuel into the cylinder with the injector by making the engine control means apply an on-time value $t_{test}$ for the injector corresponding, in accordance with said on-time calculation model or lookup table, to a test fuel quantity $\delta_{test}$ exceeding the maximum allowed fuel injection quantity of the cylinder, while maintaining the supply of fuel to the fuel accumulator interrupted, this test injection being executed under such conditions that no ignition of the injected fuel takes place in the cylinder;

C) to determine or receive a pressure drop value $\Delta P$ representing the pressure drop of the fuel in the fuel accumulator during the test injection and a fuel pressure value $P_{test}$ representing the fuel pressure in the fuel accumulator at the start of said pressure drop;

D) to establish the actual fuel quantity $\delta_{actual}$ injected into the cylinder during said test injection with the aid of a fuel quantity calculation model or lookup table based on said pressure drop value $\Delta P$ and said fuel pressure value $P_{test}$;

E) to compare said actual fuel quantity $\delta_{actual}$ with said test fuel quantity $\delta_{test}$, or to compare an on-time value $t_a$ established with the aid of said on-time calculation model or lookup table based on said actual fuel quantity $\delta_{actual}$ and said fuel pressure value $P_{test}$ with the on-time value $t_{test}$ applied for the test injection; and F) to adjust said on-time calculation model or lookup table in dependence on the result of said comparison.

Figure 3:
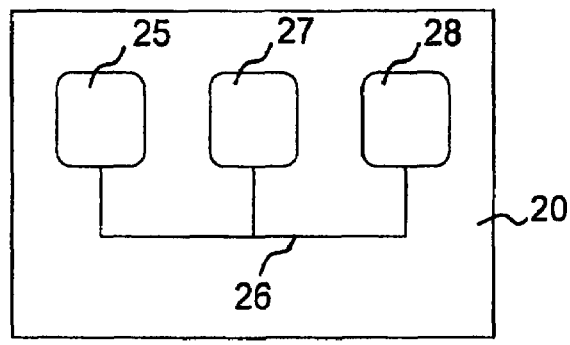
FIG. 3 is a schematic outline diagram of an engine electronic control unit for implementing a method according to the invention.

FIG. 3 very schematically illustrates the above-indicated engine control means 20 in the form of an engine electronic control unit comprising an execution means 25, such as a central processing unit (CPU), for executing computer software. The execution means 25 communicates with a memory 27, for instance of the type RAM, via a data bus 26. The control unit 20 also comprises data storage medium 28, for instance in the form of a memory of the type ROM, PROM, EPROM or EEPROM or a Flash memory. The execution means 25 communicates with the data storage medium 28 via the data bus 26. A computer program comprising computer program code for implementing a method according to the invention is stored on the data storage medium 28.

The invention is of course not in any way restricted to the embodiments described above. On the contrary, many possibilities to modifications thereof will be apparent to a person with ordinary skill in the art without departing from the basic idea of the invention as defined in the appended claims.

The invention claimed is:

1. A control system for controlling an injector of a cylinder in a combustion engine where the injector is connected to a fuel accumulator of a common-rail fuel injection system, the control system comprising:

a data storage medium having stored thereon an on-time calculation model or a lookup table and a fuel quantity calculation model or a lookup table; and an engine control device operable to establish an on-time value (t) for the injector with the aid of the on-time calculation model or the lookup table based on a fuel pressure value (P) and a fuel injection quantity value ($\delta$), wherein the fuel pressure value (P) represents the fuel pressure in the fuel accumulator, the fuel injection quantity value ($\delta$) represents a desired quantity of fuel to be injected into the cylinder and the on-time value (t) represents the associated on-time for the injector, the engine control device comprises a processor operable to execute the following steps:

A) interrupt the supply of fuel to the fuel accumulator;

B) execute a test injection of fuel into the cylinder with the injector by applying an on-time value ($t_{test}$) for the injector corresponding, in accordance with the on-time calculation model or the lookup table, to a fuel injection quantity ($\delta_{test}$) denominated a test fuel quantity, which exceeds a maximum allowed fuel injection quantity of the cylinder, while maintaining the supply of fuel to the fuel accumulator interrupted, the test injection being executed under such conditions that no ignition of the injected fuel takes place in the cylinder;

C) determine or receive a pressure drop value ($\Delta P$) representing the pressure drop of the fuel in the fuel accumulator during the test injection and a fuel pressure value ($P_{test}$) representing the fuel pressure in the fuel accumulator at the start of the pressure drop;

D) establish the actual fuel quantity ($\delta_{actual}$) injected into the cylinder during the test injection with the aid of the fuel quantity calculation model or a lookup table based on the pressure drop value ($\Delta P$) and the fuel pressure value ($P_{test}$);

E) compare the actual fuel quantity ($\delta_{actual}$) with the test fuel quantity ($\delta_{test}$), or compare an on-time value ($t_a$) established with the aid of the on-time calculation model or the lookup table based on the actual fuel quantity ($\delta_{actual}$) and the fuel pressure value ($P_{test}$) with the on-time value ($t_{test}$) applied for the test injection; and F) adjust the on-time calculation model or the lookup table in dependence on the result of the comparison.

2. An engine electronic control unit comprising an execution device, a memory connected to the execution device and a data storage medium connected to the execution device, and a computer program according to claim 1 being stored on the data storage medium; the computer program loadable directly into the internal memory of an engine control device in a motor vehicle comprising a combustion engine having an injector of a cylinder connected to a fuel accumulator of a common-rail fuel injection system, on-time values (t) for the injector being controlled by the engine control device with the aid of an on-time calculation model or a lookup table based on a fuel pressure value (P) and a fuel injection quantity value ($\delta$), the fuel pressure value (P) representing the fuel pressure in the fuel accumulator, the fuel injection quantity value ($\delta$) representing a desired quantity of fuel to be injected into the cylinder and the on-time value (t) representing the associated on-time for the injector, the computer program comprising computer program code for causing the engine control device:

A) to interrupt the supply of fuel to the fuel accumulator;

B) to execute a test injection of fuel into the cylinder with the injector by making the engine control device apply an on-time value ($t_{test}$) for the injector corresponding, in accordance with the on-time calculation model or the lookup table, to a fuel injection quantity ($\delta_{test}$) denominated a test fuel quantity, which exceeds a maximum allowed fuel injection quantity of the cylinder, while maintaining the supply of fuel to the fuel accumulator interrupted, the test injection being executed under such conditions that no ignition of the injected fuel takes place in the cylinder;

C) to determine or receive a pressure drop value ($\Delta P$) representing the pressure drop of the fuel in the fuel accumulator during the test injection and a fuel pressure value ($P_{test}$) representing the fuel pressure in the fuel accumulator at the start of the pressure drop;

D) to establish the actual fuel quantity ($\delta_{actual}$) injected into the cylinder during the test injection with the aid of a fuel quantity calculation model or a lookup table based on the pressure drop value ($\Delta P$) and the fuel pressure value ($P_{test}$);

E) to compare the actual fuel quantity ($\delta_{actual}$) with the test fuel quantity ($\delta_{test}$), or to compare an on-time value ($t_a$) established with the aid of the on-time calculation model or the lookup table based on the actual fuel quantity ($\delta_{actual}$) and the fuel pressure value ($P_{test}$) with the on-time value ($t_{test}$) applied for the test injection; and F) to adjust the on-time calculation model or the lookup table in dependence on the result of the comparison.

3. A computer program product comprising a data storage medium readable by an engine electronic control unit, and a computer program being stored on a data storage medium; the computer program loadable directly into the internal memory of an engine control device in a motor vehicle comprising a combustion engine having an injector of a cylinder connected to a fuel accumulator of a common-rail fuel injection system, on-time values (t) for the injector being controlled by the engine control device with the aid of an on-time calculation model or a lookup table based on a fuel pressure value (P) and a fuel injection quantity value ($\delta$), the fuel pressure value (P) representing the fuel pressure in the fuel accumulator, the fuel injection quantity value ($\delta$) representing a desired quantity of fuel to be injected into the cylinder and the on-time value (t) representing the associated on-time for the injector, the computer program comprising computer program code for causing the engine control device:

A) to interrupt the supply of fuel to the fuel accumulator;

B) to execute a test injection of fuel into the cylinder with the injector by making the engine control device apply an on-time value ($t_{test}$) for the injector corresponding, in accordance with the on-time calculation model or the lookup table, to a fuel injection quantity ($\delta_{test}$) denominated a test fuel quantity, which exceeds a maximum allowed fuel injection quantity of the cylinder, while maintaining the supply of fuel to the fuel accumulator interrupted, the test injection being executed under such conditions that no ignition of the injected fuel takes place in the cylinder;

C) to determine or receive a pressure drop value ($\Delta P$) representing the pressure drop of the fuel in the fuel accumulator during the test injection and a fuel pressure value ($P_{test}$) representing the fuel pressure in the fuel accumulator at the start of the pressure drop;

D) to establish the actual fuel quantity ($\delta_{actual}$) injected into the cylinder during the test injection with the aid of a fuel quantity calculation model or a lookup table based on the pressure drop value ($\Delta P$) and the fuel pressure value ($P_{test}$);

E) to compare the actual fuel quantity ($\delta_{actual}$) with the test fuel quantity ($\delta_{test}$), or to compare an on-time value ($t_a$) established with the aid of the on-time calculation model or the lookup table based on the actual fuel quantity ($\delta_{actual}$) and the fuel pressure value ($P_{test}$) with the on-time value ($t_{test}$) applied for the test injection; and F) to adjust the on-time calculation model or the lookup table in dependence on the result of the comparison.

4. A method for adjusting an on-time calculation model or a lookup table used for determining on-time values for an injector of a cylinder in a combustion engine, wherein the injector is connected to a fuel accumulator, the method comprising:

steps of injecting a test fuel quantity exceeding the maximum allowed fuel injection quantity under such conditions that no ignition of the injected fuel takes place;

measuring the pressure drop in the fuel accumulator during the test injection;

establishing the actual fuel quantity injected during the test injection based on the pressure drop;

performing a comparison based on the actual fuel quantity or the corresponding on-time value established with the aid of the on-time calculation model or the lookup table; and adjusting the on-time calculation model or lookup table in dependence on the result of the comparison.

5. A method for adjusting an on-time calculation model or a lookup table used for determining on-time values (t) for an injector of a cylinder in a combustion engine where the injector is connected to a fuel accumulator of a common-rail fuel injection system, the on-time values (t) for the injector being controlled by an engine control device with the aid of the on-time calculation model or lookup table based on a fuel pressure value (P) and a fuel injection quantity value ($\delta$), the fuel pressure value (P) representing the fuel pressure in the fuel accumulator, the fuel injection quantity value ($\delta$) representing a desired quantity of fuel to be injected into the cylinder and the on-time value (t) representing the associated on-time for the injector, the method comprising the steps of:

A) interrupting the supply of fuel to the fuel accumulator;

B) executing a test injection of fuel into the cylinder with the injector by making the engine control device apply an on-time value ($t_{test}$) for the injector corresponding, in accordance with the on-time calculation model or lookup table, to a test fuel injection quantity ($\delta_{test}$), which exceeds a maximum allowed fuel injection quantity of the cylinder, while maintaining the supply of fuel to the fuel accumulator interrupted, the test injection being executed under such conditions that no ignition of the injected fuel takes place in the cylinder;

C) measuring the pressure drop ($\Delta P$) of the fuel in the fuel accumulator during the test injection;

D) establishing the actual fuel quantity ($\delta_{actual}$) injected into the cylinder during the test injection with the aid of a fuel quantity calculation model or lookup table based on the measured value ($\Delta P$) of the pressure drop and the fuel pressure value ($P_{test}$) at the start of the pressure drop;

E) comparing the actual fuel quantity ($\delta_{actual}$) with the test fuel quantity ($\delta_{test}$), or comparing an on-time value ($t_a$) established with the aid of the on-time calculation model or lookup table based on the actual fuel quantity ($\delta_{actual}$) and the fuel pressure value ($P_{test}$) with the on-time value ($t_{test}$) applied for the test injection; and F) adjusting the on-time calculation model or lookup table in dependence on the result of the comparison.

6. A method according to claim 5, comprising injecting the test fuel quantity ($\delta_{test}$) into the cylinder during a cylinder stroke cycle between the moment when the cylinder pressure and thereby the cylinder temperature has dropped to such a level that no ignition of the fuel can take place in the cylinder and the moment when gases are discharged from the cylinder.

7. A method according to claim 5, wherein several adjustment cycles, each comprising said steps A-F, are performed with mutually different fuel pressure values ($P_{test}$) at the start of the test injections.

8. A method according to any of claims 5, wherein an adjustment cycle comprises the steps A-F and the method further comprising performing several of the adjustment cycles with mutually different test fuel quantities ($\delta_{test}$).

9. A method according to any of claims 5, wherein in step B, the engine control device applies an on-time value ($t_{test}$) for the injector corresponding, in accordance with the on-time calculation model or the lookup table, to a test fuel quantity ($\delta_{test}$) exceeding a maximum allowed fuel injection quantity of the cylinder by a factor of at least 1.5.

10. A method according to claim 9, wherein in step B, the engine control device applies an on-time value ($t_{test}$) for the injector corresponding, in accordance with the on-time calculation model or the lookup table, to a test fuel quantity ($\delta_{test}$) exceeding the maximum allowed fuel injection quantity of the cylinder by a factor of 2-3.

* * * * *